United States Patent
Tian et al.

(10) Patent No.: US 8,994,722 B2
(45) Date of Patent: Mar. 31, 2015

(54) METHOD FOR ENHANCING DEPTH IMAGES OF SCENES USING TRELLIS STRUCTURES

(75) Inventors: Dong Tian, Boxborough, MA (US); Yongzhe Wang, Los Angeles, CA (US); Anthony Vetro, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 441 days.

(21) Appl. No.: 13/406,139

(22) Filed: Feb. 27, 2012

(65) Prior Publication Data

US 2012/0206451 A1 Aug. 16, 2012

Related U.S. Application Data

(63) Continuation-in-part of application No. 13/307,936, filed on Nov. 30, 2011, which is a continuation-in-part of application No. 13/026,750, filed on Feb. 14, 2011.

(51) Int. Cl.
*G06T 15/20* (2011.01)
(52) U.S. Cl.
CPC .................................. *G06T 15/205* (2013.01)
USPC ........................................ 345/419; 345/582
(58) Field of Classification Search
CPC ..................................................... G06T 15/205
USPC ........................................................ 345/582
See application file for complete search history.

(56) References Cited

U.S. PATENT DOCUMENTS

| 7,728,877 | B2 | 6/2010 | Xin |
| 2010/0215251 | A1* | 8/2010 | Klein Gunnewiek et al. ............... 382/154 |
| 2011/0234756 | A1* | 9/2011 | Adler et al. ................. 348/46 |

FOREIGN PATENT DOCUMENTS

WO WO-2007052191 * 10/2006

* cited by examiner

*Primary Examiner* — Mark Zimmerman
*Assistant Examiner* — Sohum Kaji
(74) *Attorney, Agent, or Firm* — Dirk Brinkman; Gene Vinokur

(57) ABSTRACT

An image for a virtual view of a scene is generated based on a set of texture images and a corresponding set of depth images acquired of the scene. A set of candidate depths associated with each pixel of a selected image is determined. For each candidate depth, a cost that estimates a synthesis quality of the virtual image is determined. The candidate depth with a least cost is selected to produce an optimal depth for the pixel. Then, the virtual image is synthesized based on the optimal depth of each pixel and the texture images. The method also applies first and second depth enhancement before, and during view synthesis to correct errors or suppress noise due to the estimation or acquisition of the dense depth images and sparse depth features.

12 Claims, 13 Drawing Sheets

METHOD FOR ENHANCING DEPTH IMAGES OF SCENES USING TRELLIS STRUCTURES

RELATED APPLICATION

This is a Continuation-in-Part application of U.S. application Ser. No. 13/307,936 "Method for Generating Virtual Images of Scenes Using Trellis Structures," filed Nov. 30, 2011, by Tian et al, which is a Continuation-in-Part application of U.S. application Ser. No. 13/026,750, "Method for Generating Virtual images of Scenes Using Trellis Structures," filed Feb. 14, 2011, by Tian et al.

FIELD OF THE INVENTION

This invention relates generally to depth image based rendering (DIBR), and more particularly to a method for enhancing depth images using a trellis structure.

BACKGROUND OF THE INVENTION

A 3D display presents an image of a different view of a 3D scene for each eye. In conventional stereo systems, images for left and right views are acquired, encoded, and either stored or transmitted, before decoded and displayed. In more advanced systems, a virtual image with a different viewpoint than the existing input views can be synthesized to enable enhanced 3D features, e.g., adjustment of perceived depth for the 3D stereo display, and generation of a large number of virtual images for novel virtual views of the scene to support multi-view autostereoscopic displays.

Depth image based rendering (DIBR) is a method for synthesizing the virtual images, which typically requires depth images of the scene. Depth images are likely to include noise, which can produce artifacts in the rendered images, and pixel-level depth images cannot always represent depth discontinuities that typically occur at object boundaries, which is another source of artifacts in the rendered images.

As shown in FIG. 1 prior art view synthesis includes a warping step 110, in which pixels corresponding to virtual positions are warped from reference input images 101-102, i.e., texture and depth images for reference images, based on a geometry of the scene to warped images. In the texture images, each pixel (sample) has a 2D location and intensity, which can be a color if three (RGB) channels are used. In the depth images, each pixel at a 2D location is a depth from the camera to the nearest point in the scene.

During blending 120, the warped images, for each input viewpoint, are combined into a single image. Hole filling 130 fills any remaining holes in the blended images to produce a synthesized virtual image 103. The blending is only performed when there are multiple input viewpoints from which the synthesized virtual image is generated.

The warping step can include forward warping and backward warping. With forward warping, the pixels in the reference image are mapped to a virtual image via a 3D projection. With backward warping, the pixels in the reference images are not directly mapped to the virtual image. Instead, the depths are mapped to the virtual image, and the warped depth image is then used to determine a corresponding pixel in the reference image for each pixel location in the virtual image.

Most of the pixels in the virtual image are mapped after the warping process. However, some pixels do not have any corresponding mapped depths, which are caused by disocclusion from one viewpoint to another. The pixels without mapped depths are known as holes in the virtual image.

When there are multiple input reference images, the blending is used to merge the warping results into a single image. Some holes can be filled in a complementary way during this step. That is, a hole in the left reference image can have a mapped value from the right reference image. In addition, the blending can also resolve mapping conflicts, which arise when there are different mapped values from different reference images. For example, a weighted average can be applied, or one of the mapping values is selected depending on the proximity of the virtual viewpoint location relative to the reference images.

Following the blending process, some holes remain. Hence, final hole filling is required. For example, in-painting can be used to propagate surrounding pixel values into the remaining holes. One implementation propagates the background pixels into small holes.

Prior art methods cannot deal with errors in the depth map images. Therefore, there is a need for a more accurate view synthesis to improve a quality of the synthesized image so that the synthesized image is free of boundary artifacts, and is geometrically consistent with the image characteristics that are present in the input images.

SUMMARY OF THE INVENTION

View synthesis is an essential function for a number of 3D video applications, including free-viewpoint navigation, and image generation for auto-stereoscopic displays. Depth image based rendering (DIBR) methods are typically applied for this purpose.

However, a quality of the rendered images is very sensitive to the quality of the depth image, which is typically estimated by an error prone process. Furthermore, per-pixel depth images are not an ideal representation of a 3D scene, especially along depth boundaries. That representation can lead to unnatural synthesis results for scenes with occluded regions.

The embodiments of the invention provide a trellis-based view synthesis method that overcomes the above limitations in depth images and can reduce artifacts in the rendered images. With this method, a candidate set of depths are identified for each pixel that needs to be warped, based on an estimated depth for that pixel, as well as neighboring depths. The cost for each candidate depth is quantified based on an estimate of the synthesis quality. Then, then the candidate depth with the optimal expected quality is selected.

The method applies a first and second depth enhancement before, and during view synthesis to correct errors or suppress noise due to the estimation or acquisition of the dense depth images and sparse depth features.

DETAILED DESCRIPTION OF THE PREFERRED EMBODIMENT

Depth images are likely to have errors produced by an estimation or acquisition process. Additionally, the representation of per-pixel depth images is not always accurate at depth discontinuities.

Therefore, the embodiments of our invention provide a trellis-based view synthesis method to overcome limitations in depth image representation and estimation. The depth images can be acquired by range cameras, or estimated from stereo disparity correspondences in left and right texture images. Our method is applied during a warping process of depth image based rendering (DIBR).

Figure 1:
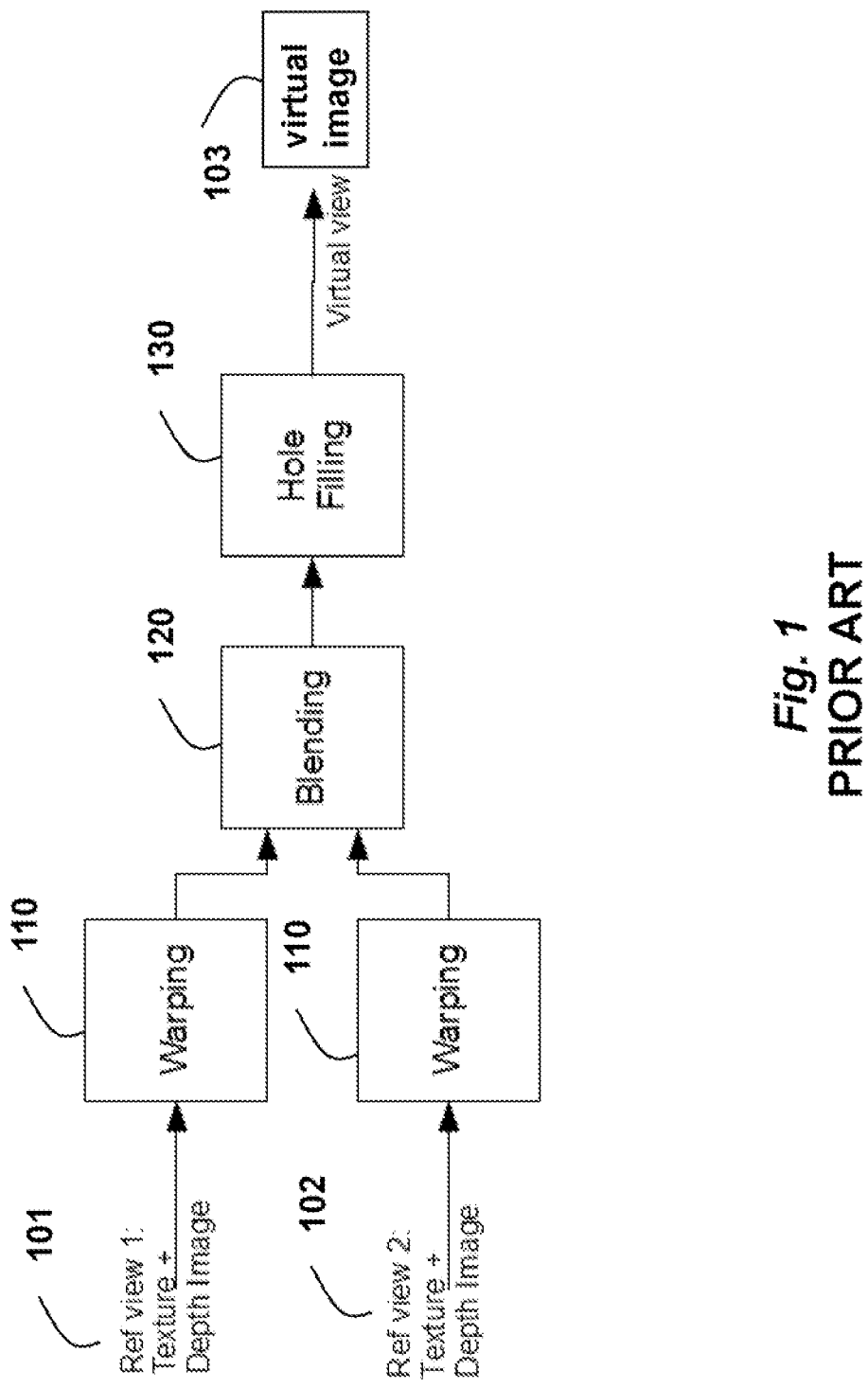
FIG. 1 is a block diagram of a prior art view synthesis method.
Figure 2:
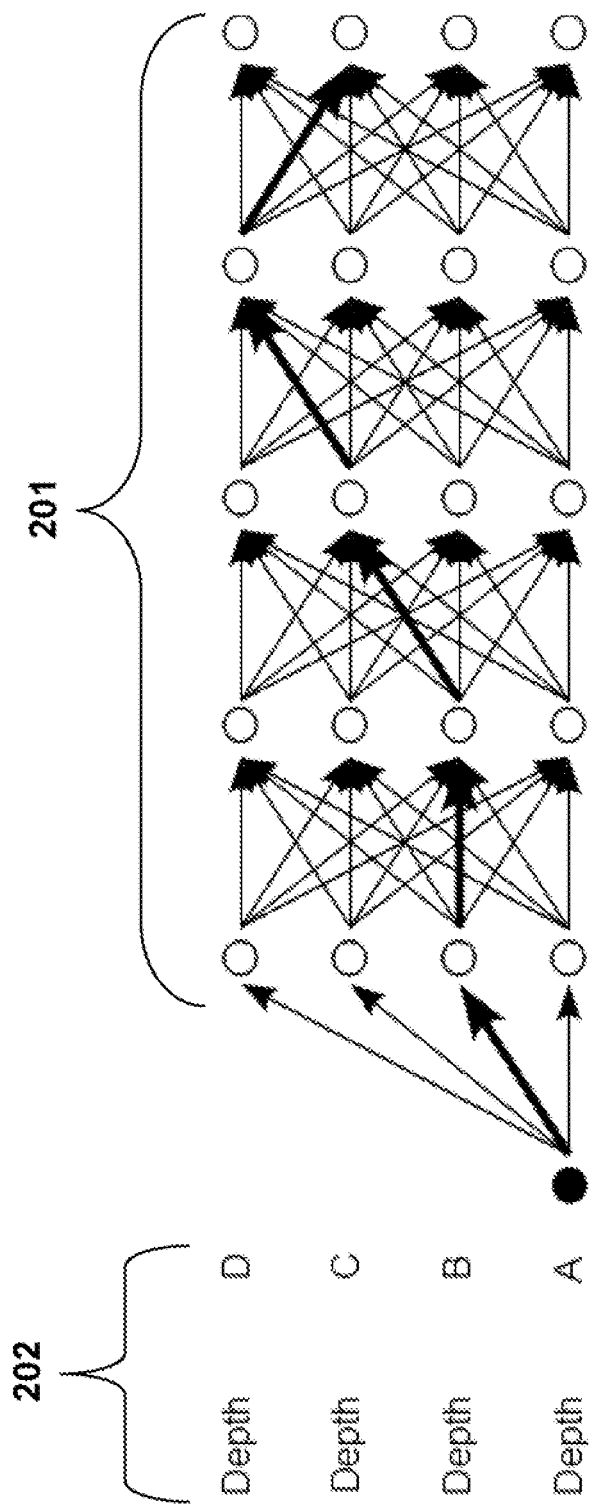
FIG. 2 is a schematic of a trellis for view synthesis constructed according to embodiments of the invention.

FIG. 2 shows an example of a trellis 201 constructed for view synthesis according to embodiments of our invention. The trellis 201 is constructed for a predetermined number of pixels. In one embodiment, one line of image pixels is arranged into the trellis, and the warping process is performed line-by-line. That is, each column of the trellis represents one image pixel with different depths A-D. The nodes in each column of the trellis represent the candidate depth mappings for that pixel in a virtual image.

In a first step, a set of candidate depths (A, B, C, D) 202 is identified for each pixel. The set includes the estimated depth from the input depth image, as well as several other candidate depths based on neighboring depths. The number of candidate depths corresponds to the number of rows in the trellis. In FIG. 2, each pixel has four depths A-D corresponding to the four rows in the trellis.

In a second step, a cost function is used to estimate a synthesis quality, which is the criterion to select the optimal candidate depth.

Determining the Set of Candidate Depths

In the first step, a set of candidate depths are identified, including the estimated depth from the input depth image. In addition to this, several other candidate depths are identified from the neighboring depths. The candidate depths can be used when the estimated depth from the input depth image is incorrect, i.e., the depth leads to artifacts, or inconsistencies with the input images. Several methods are described below to determine the optimal candidate depths.

One method to determine the set of candidate depths is with a predetermined increase and/or decrease relative to an estimated depth from the input depth image. For instance, if the estimate depth is 50, then the candidate set of depths can include {49, 50, 51}. Increments by factors other than one can also be considered. The number of depths can also be variable and not necessarily symmetric around the estimated depth, e.g., the set can be {46, 48, 50, 52, 54} or {48, 49, 50, 52, 54}. The candidate depths can also be determined by a look-up table, in which the candidate depths can possibly vary for each estimated depth.

A second method to determine the set of candidate depths is with a predicted based on the depths from neighboring pixels. For example, the average or median depth from neighboring depths can be used. A predetermined window size can also be used to determine the number of neighboring pixels to consider in the prediction.

Figure 3:
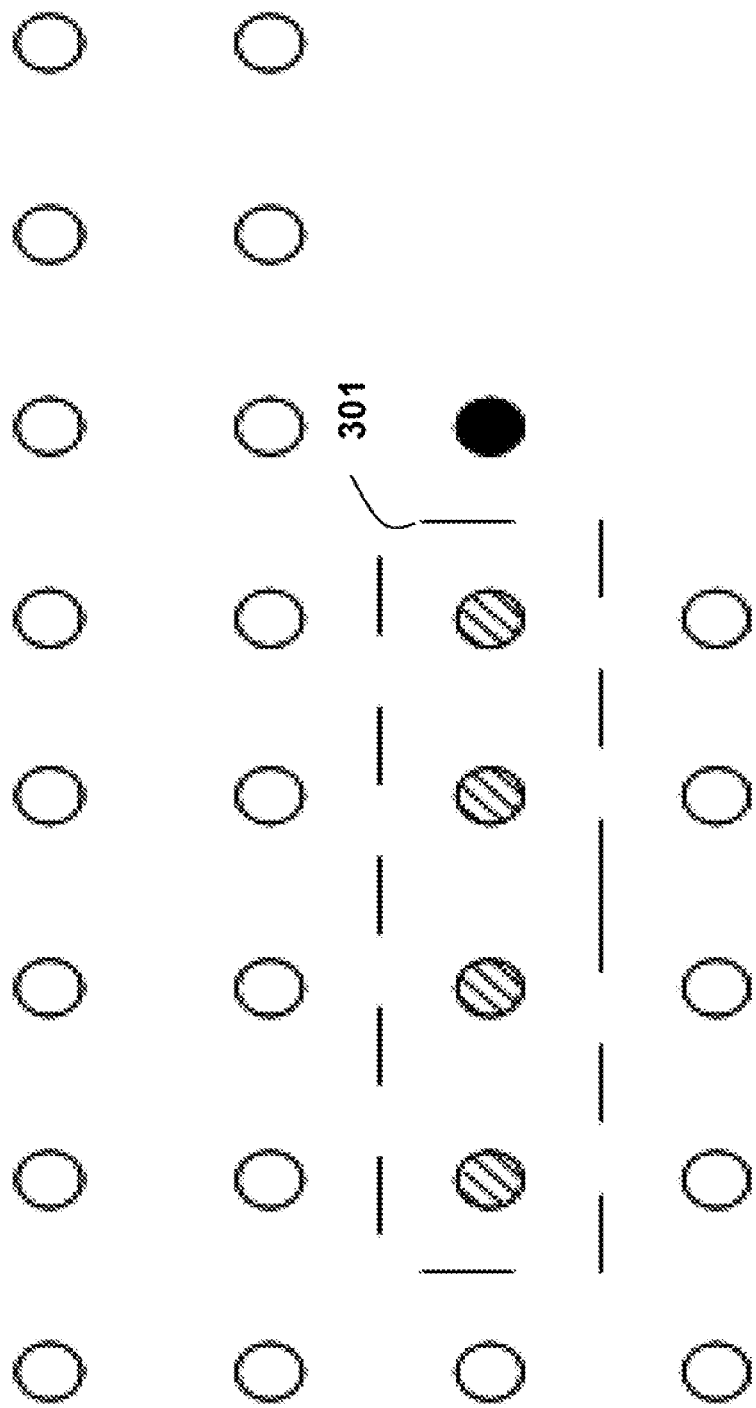
FIG. 3 is a schematic of neighboring pixels used to predict depth for a next pixel according to embodiments of the invention.
Figure 4:
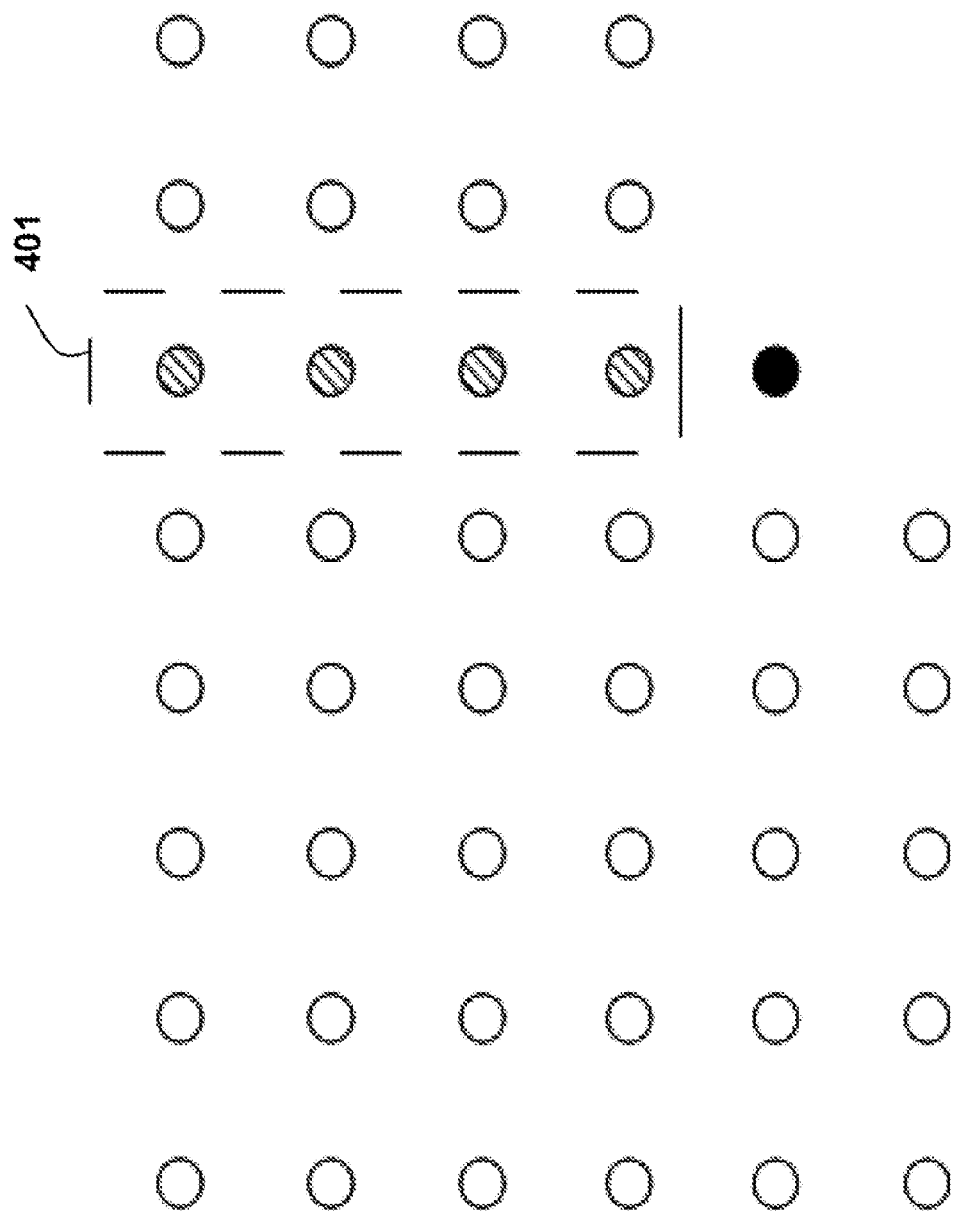
FIG. 4 is another schematic of neighboring pixels used to predict the depth for a next pixel according to embodiments of the invention.
Figure 5:
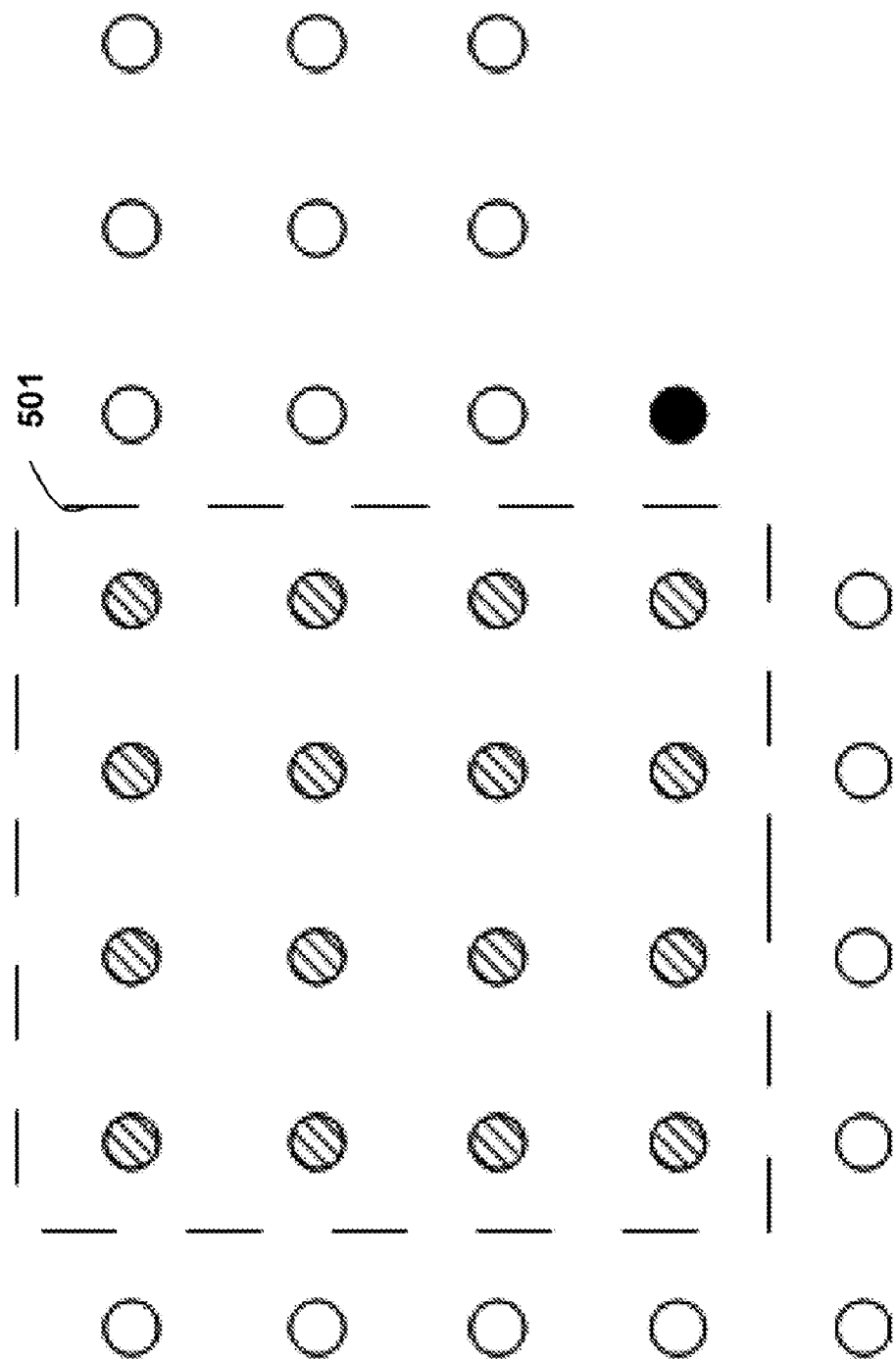
FIG. 5 is another schematic of neighboring pixels used to predict the depth for the next pixel according to embodiments of the invention.

A preferred method includes the preceding pixels in a window from the same line. In FIG. 3, four (4) pixels 301 in the same line from the left are within the window. In FIG. 4, four (4) pixels 401 in the same column from above lines are within the window. In FIG. 5, a 4×4 window of pixels 501 is identified. In another embodiment, the pixels can conform to any shape. An increase in the number of candidate depths results in an increase in the computational complexity because each candidate is checked and compared.

In FIG. 2, the number of candidate depths is set to four for each pixel. In one example, depth A (the first row from the bottom) represents the estimated depth from the input depth image. Depth B and C (row 2 and 3 in the middle) are the depths increased or decreased by 1 from depth A, respectively. Depth D (top row) indicates the predicted depth by using the median depth from the neighboring pixels as shown in FIG. 3.

View Synthesis Using Dynamic Programming

After a set of candidate depths is determined, each node in the trellis is assigned a metric according to a cost function, which estimates the synthesis quality. Then, the view synthesis problem is solved by determining an optimal set of depths across the trellis. We use, for example, dynamic programming to solve the optimization problem.

To estimate the synthesis quality, an evaluation function is defined as the cost function. The cost function can depend on whether the warping process is forward warping, or backward warping. Without loss of generality, we describe the definition of the cost function assuming backward warping for the preferred embodiments this invention. This definition adapted to forward warping.

In one implementation, the cost function evaluates a mean square error (MSE) between two square blocks of pixels. The blocks are upper-left blocks relative to the pixel location. Let (x, y) denote the current pixel location, (x', y') denote the warped position using a candidate depth.

The first block is located at (x-s, y-s)-(x, y) in the synthesized virtual image, where s is the block size, and the second block is located at (x'-s, y'-s)-(x', y') in the reference image. Cropping is applied if part of the block goes beyond the image area.

An energy function, other than MSE, can also be used as the cost function. For instance, the average absolute error is an effective cost function to estimate the synthesis quality. Also, image features or a structural similarity measure can be extracted from the blocks, and a matching process can be used to determine whether the blocks are geometrically consistent.

Because any artifacts in the foreground objects are more easily perceived by human eyes, a method is needed to synthesize the foreground objects in a consistent manner. Thus, in our invention, the upper-left blocks are not always used to determine the cost metric.

Figure 6:
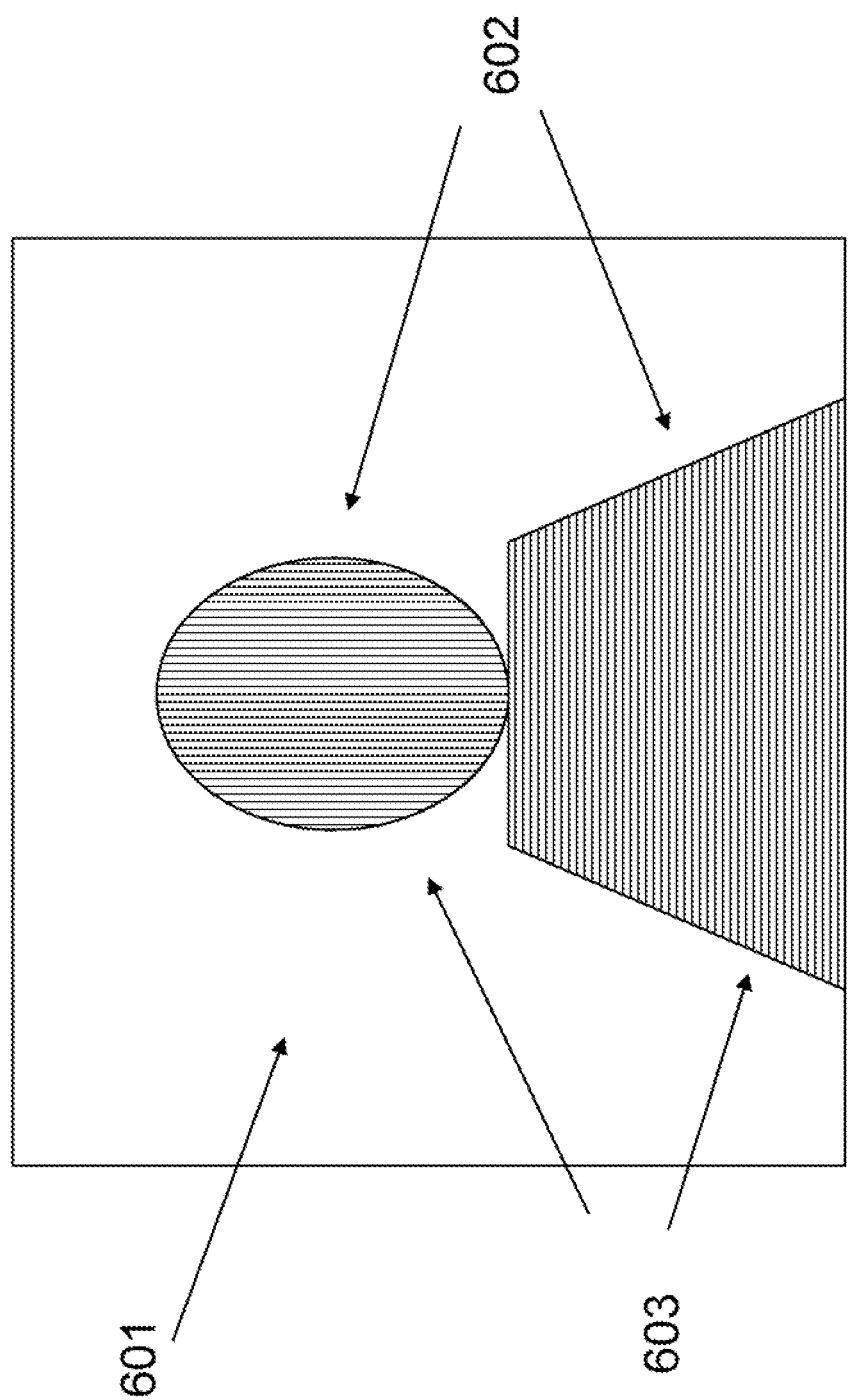
FIG. 6 is a schematic of increasing and decreasing depth boundary assigned different cost functions according to embodiments of the invention.

As shown in FIG. 6, a pixel is classified into three types of areas: a flat area 601, a decreasing depth area 602, and an increasing depth area 603, as shown in FIG. 6. For pixels at decreasing depth boundaries (right boundaries in FIG. 6), or flat areas, the upper-left block is used. The upper-right block is used for pixels at increasing depth boundaries (left boundaries in FIG. 6).

In some applications, a confidence map can also be used as an input to the synthesis process, in addition to the estimated depth image. The cost function for the depth from the depth image can be weighted by a factor when the depth estimator indicates a high confidence.

System Embodiments

In the following, three embodiments shown in FIGS. 7-9 for the trellis-based image synthesis are described. These embodiments are ordered in ascending complexity. In the Figs. the "samples" are the pixels in the various images.

Figure 7:
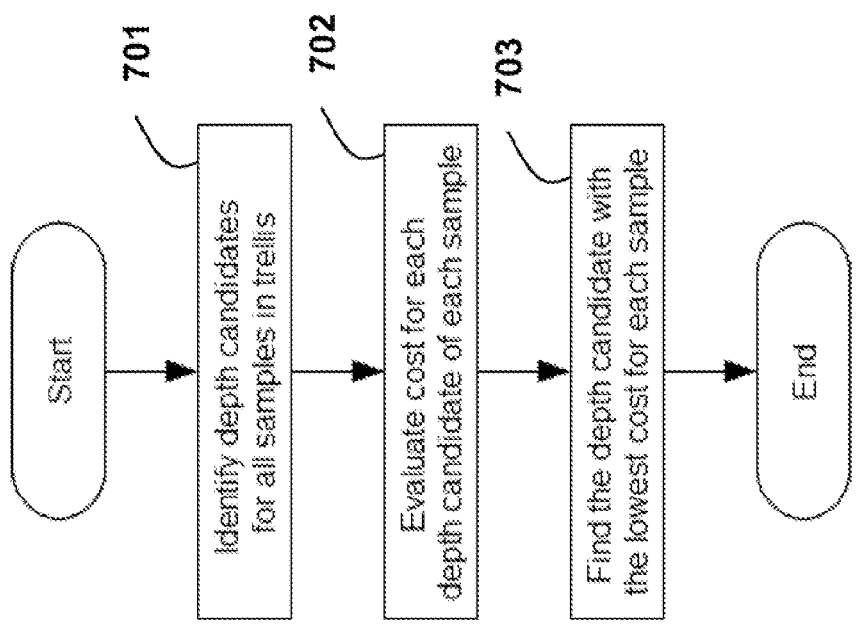
FIG. 7 is a flowchart of a method for trellis based view synthesis according to embodiments of the invention.

In the first embodiment as shown in FIG. 7, local optimization is performed with limited complexity. In this embodiment, candidate depth selection does not depend on the selection of the optimal depth candidates from previous pixels. So, the candidate depth assignment and evaluation of the pixels can be performed in parallel. A step-by-step description of this implementation is described below.

The steps shown in various Figs. can be performed in a processor connected to a memory and input/output interfaces as known in the art. The virtual image can be rendered and outputted to a display device. Alternatively, the steps can be implemented in a system using means comprising discrete electronic components in a video encoder or decoder (codec). More specifically, in the context of a video encoding and decoding system (codec), the method described in this invention for generating virtual images can also be used to predict the images of other views. See for example U.S. Pat. No. 7,728,877, "Method and system for synthesizing multiview videos," incorporated herein by reference.

Step 701: Identify candidate depths for all pixels in the trellis. In this step, the following candidates are determined.
a. Depth A: Select the depth signaled in the depth image for the current pixel. If the pixel is not the first pixel in its line, then two more depth candidates are selected as follows.
b. Depth B: Select the depth that is most different from Depth A in a set of depths that are signaled in the depth image for a number of previous pixels of the same line. The previous pixels are as shown in FIG. 3. Four previous pixels are preferred.
c. Depth C: Different from Depth B and selected from the same line, Depth C is selected among the depths in the same column from the above lines, as shown in FIG. 4, which is most different from Depth A.
d. Depth D: No such candidate depth in this embodiment.

Step 702: Evaluate the cost for each candidate depth of each pixel.

Step 3: Compare the costs of all the candidate depths for each pixel and determine the one with least cost. Select the corresponding depth for each pixel.

Figure 8:
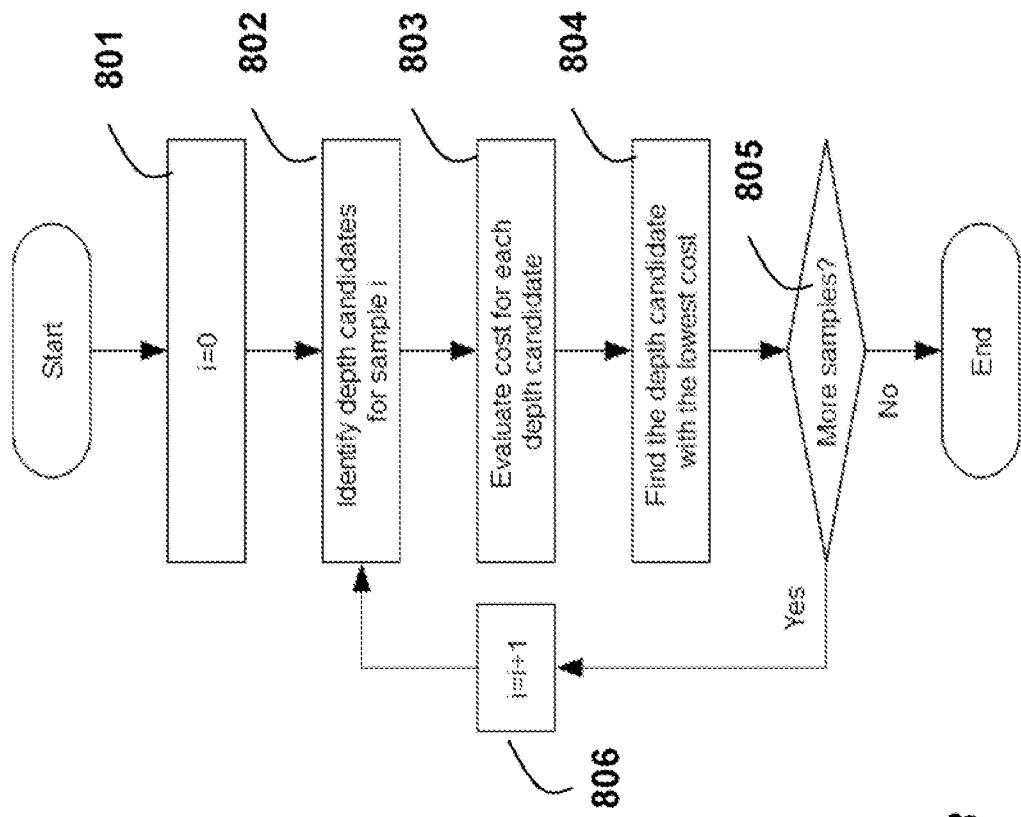
FIG. 8 is a flowchart of a non-iterative method for trellis based view synthesis according to embodiments of the invention.

FIG. 8 shows a second embodiment, which is also a local optimization with limited complexity. In this implementation, the candidate depth assignments in a column of the trellis depend on the optimal depth selection for the immediate previous pixel or column in the trellis. Below is a step-by-step description of this implementation.

Step 801: we initialize the index i.

Step 802: Identify candidate depths for pixel i. In this step, we include three depth candidates, which are selected in a similar way as the embodiment shown in FIG. 7. However, when deriving depth B and C, the optimal depths from previous pixels are used, which can be different from what is signaled in the depth image.

Step 803: Evaluate the cost for each depth candidate of pixel i.

Step 804: Compare the costs of all the depth candidates and determine the least cost for pixel i.

Step 805: If there are more pixels not processed in the trellis, then increase i 806 by one, and iterate.

In the first two embodiments, the optimal depth candidate is selected in the trellis column by column by evaluating a local cost function. In the third embodiment, the optimal path across the trellis, which is a combination of depth candidates from the columns, is determined. A path cost is defined as the sum of the node costs within the path.

A node can have different costs in different paths. This embodiment is shown in FIG. 9. The procedure has two loops iterating over i and p. The outer loop is over all possible paths, while the inner loop is for all nodes in one possible path.

For each potential path, we identify 901 and evaluate 902 the candidate depth for the nodes sequentially in the path. The depth candidate assignments are determined as follows. Determine 903 if there are more pixels in the path.

If the next node locates at row "Depth A," then the node is set to the depth as signaled in the depth image. If the node locates at row "Depth B," then we select the depth, which is the median depth from a set of given depths of previous pixels in the same line. The given depths of the previous pixels are specified for the current path. If the node locates at row "Depth C," the node is selected as the median of those depths from the same column of above lines in the image.

The Depth B can be assigned different depths for a same node when it is crossed by different paths. Depth A and C are kept the same for different paths.

After all the nodes in a path are evaluated, the path cost is determined 904 as the total of the node costs, and if no more paths 905, the path with the minimum cost is used 906 for the final synthesis result.

View Synthesis with Sparse Depth

In our related application Ser. No. 13/026,750, we use a depth image as input to the view synthesis process, where the estimated depth is considered one of several candidate depths in the trellis based view synthesis process. In this way, each pixel in the input images is associated with a corresponding depth to form a depth image. These depth images are referred to as dense depth images.

In contrast, sparse depth features refer to a collection of depths that are associated with a small subset of pixels in the input texture images. A number of known techniques can be used to determine sparse depth features including the well-known Kanade-Lucas-Tomasi (KLT) feature tracker, which first detects corner points or salient features of an image, e.g., the left view, then finds a corresponding feature in another image, e.g., the right view.

Figure 10:
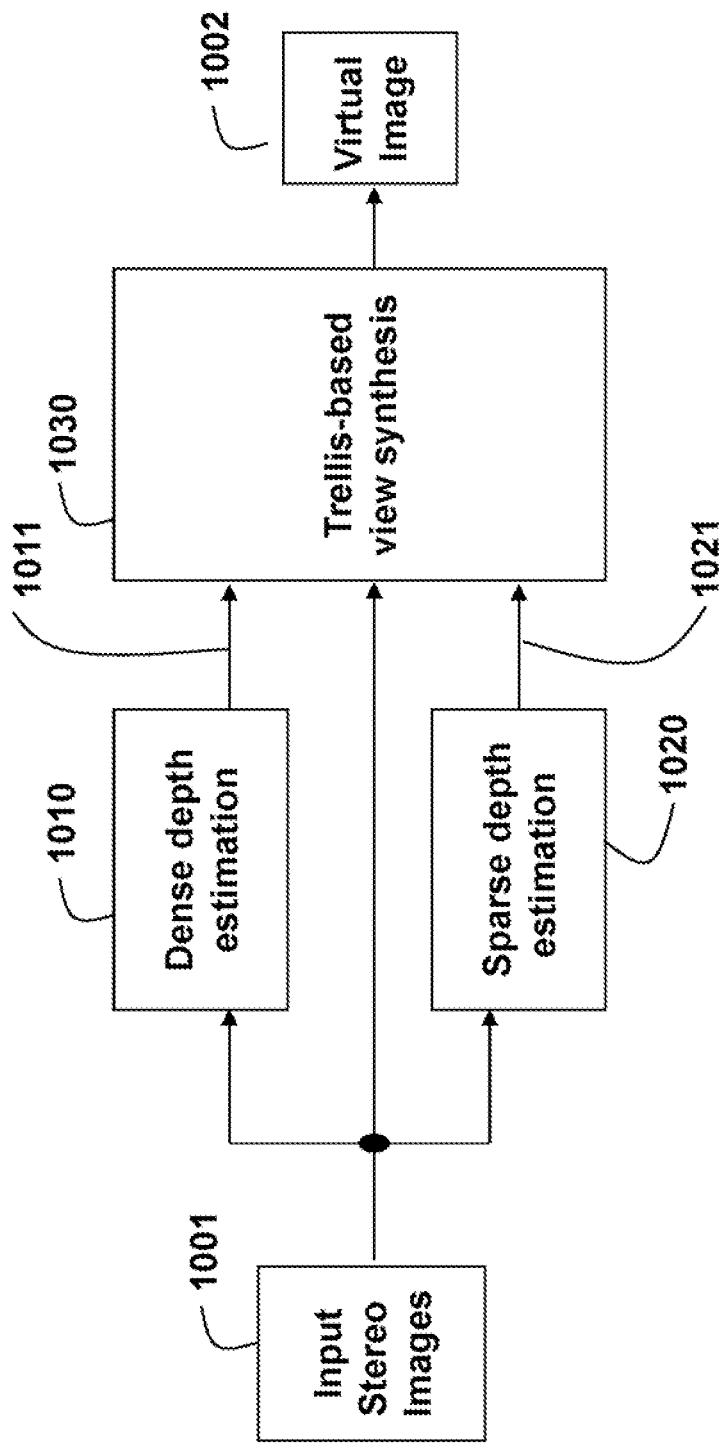
FIG. 10 is a block diagram of a system including dense depth estimation, sparse depth estimation and trellis based view synthesis according to embodiments of the invention.

As shown in FIG. 10, dense depth estimation 1010 is performed from input stereo video images (video) 1001 to produce dense depth images 1011 corresponding to the left and right views of the stereo pair. Similarly, sparse depth estimation 1020 is performed from the input stereo video to produce a set of sparse depth features 1021, based on correspondences in the left and right views of the stereo pairs.

Then, a trellis based view synthesis 1030 is performed as described above with reference to FIGS. 7-9, using the dense depth images, the sparse depth features and the input stereo video to produce a virtual image 1002.

For convenience of this description the sparse depth features form a so called a sparse depth image.

Figure 11:
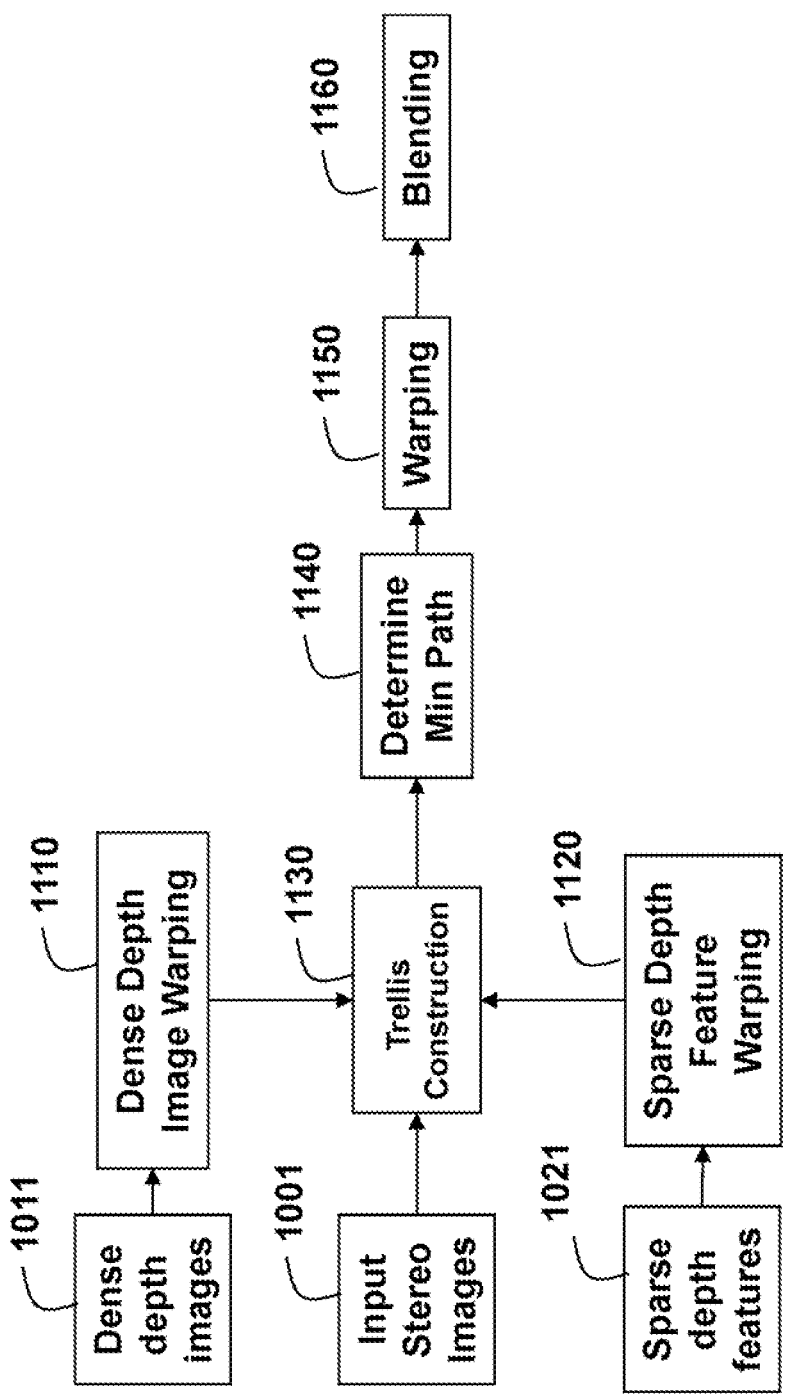
FIG. 11 is a block diagram of trellis based view synthesis based on dense depth images and sparse depth features according to embodiments of the invention.

As shown in FIG. 11, the dense depth images 1011 are subject to a dense depth warping 1110, which generates warped dense depth images that correspond to the position of the virtual view. The warping is achieved by mapping each depth to the corresponding depth in the virtual view according to the virtual view position and parameters of the scene geometry.

In a preferred embodiment of the invention, there are two warped dense depth images: one corresponding to the warping of the dense depth image of the left view, and another corresponding to the warping of the dense depth image of the right view. The depths of the warped dense depth images are candidate depths for the trellis based view synthesis.

Furthermore, the sparse depth features 1021 are subject to a sparse depth mapping 1120, which first generates warped sparse depth features within the virtual view. The warping of sparse depth features is similar to the warping of dense depth images, but is done on a smaller subset of features relative to the full set of pixel positions in the input images. Then, a dense set of depths are determined from the set of warped sparse features using known prior art techniques such as nearest neighbor assignment, linear interpolation, bi-cubic interpolation, etc.

Alternatively, the interpolation can be first performed on the sparse depth features and then mapped to the virtual view. The output of the sparse depth mapping process produces additional candidate depths for the trellis based view synthesis.

As shown in FIG. 2, multiple candidate depths can be evaluated for the view synthesis of each pixel in the virtual view. In a preferred embodiment of the invention, the candidate depths are determined from dense depth images and sparse depth feature.

The trellis construction 1130 in FIG. 11 generates a trellis as shown in FIG. 2, where each column corresponds to one pixel position in the virtual view and each node in one column corresponds to one candidate depth to be used for synthesis.

The trellis is constructed for one row of the virtual view image. Each node is associated with one candidate depth and an estimated synthesis quality metric using the disparity candidate. All methods described earlier to generate candidate depths can be used. Additionally, candidate depths determined from the sparse depth features can be used in creating the trellis.

Figure 9:
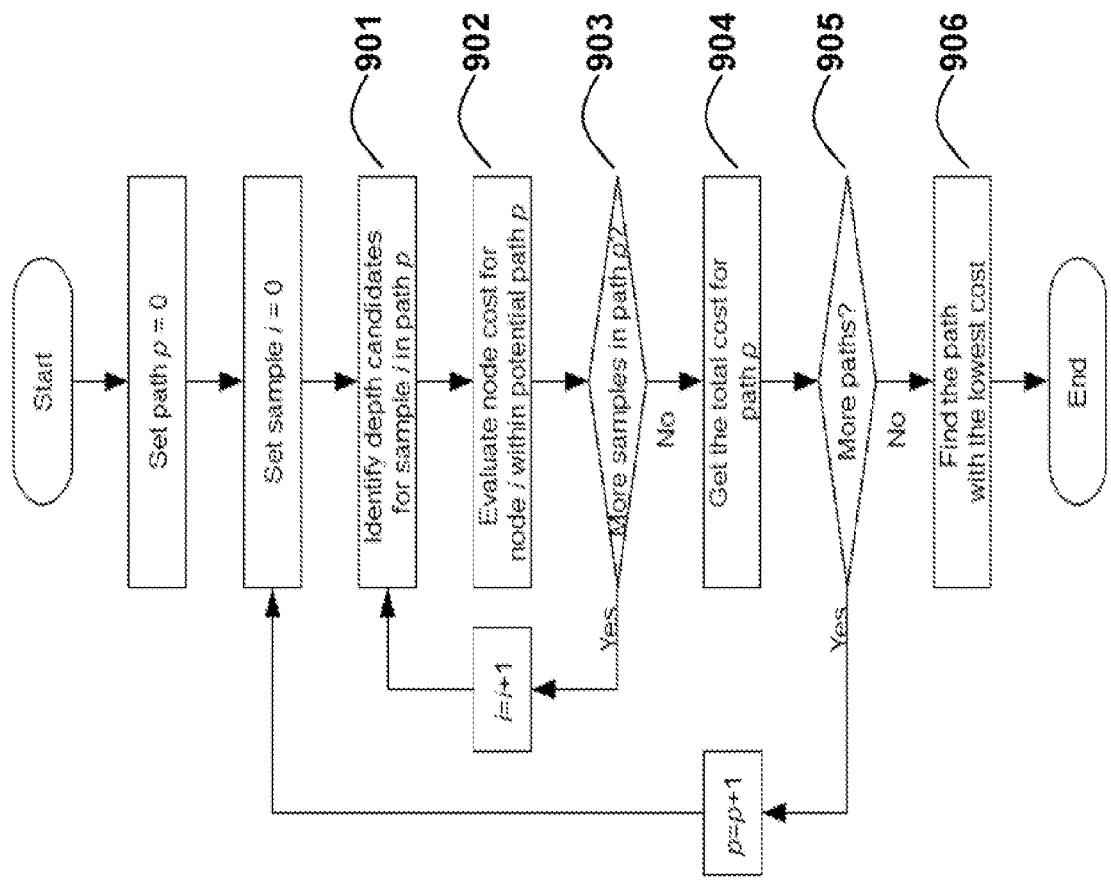
FIG. 9 is a flowchart of an iterative method for trellis based view synthesis according to embodiments of the invention.

After the trellis is constructed, a minimum cost path through the trellis is determined 1140 in accordance with the embodiments described for FIGS. 7-9. The resulting set of depths is used to warp 1150 the input images to the virtual view position. This process is done for both left and right input views.

Finally, a blending step 1160 averages the left and right views by weighting factors determined by their distance from the reference views. If the virtual view position is nearer to the left view, the warped view from left view has a larger weighting factor than that from the right view. A hole-pixel in one warped view is filled using the other warped view if it is not a hole in the other warped view. After blending, the final virtual view image is displayed.

Depth Enhancement with Trellis and Sparse Depth

Figure 12:
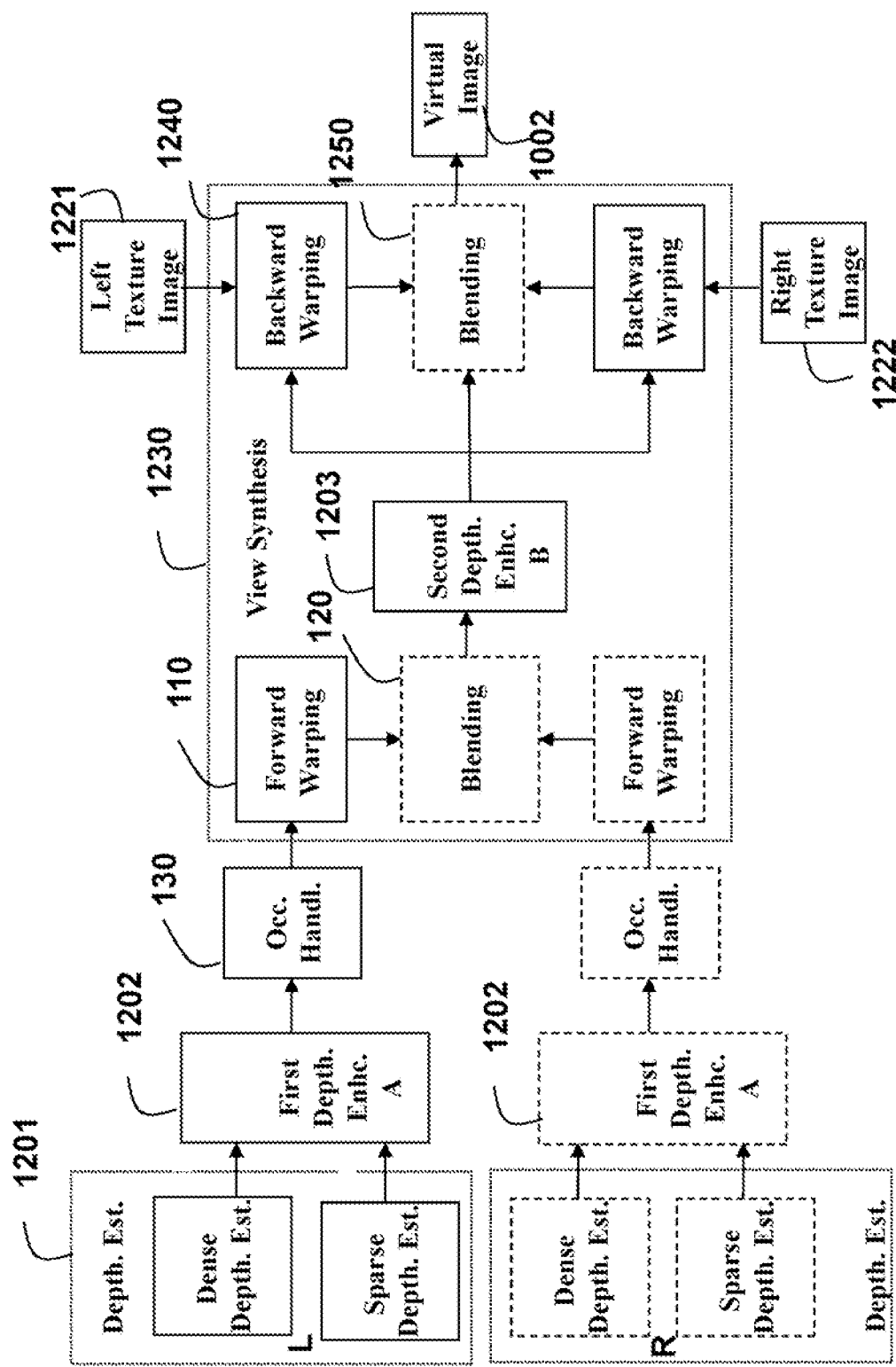
FIG. 12 is block diagram of trellis based view synthesis using depth enhancement methods according to embodiments of the invention.

For clarity, only the processing for the left view is shown and described with respect to FIG. 12. The processing for the right view is similar. Optional items are shown with broken lines.

The above embodiments of the invention described a method of view synthesis that utilize the dense depth image 1011 and the sparse depth features 1021, where the estimated depths as well as sparse depth features are used to determine several candidate depths as part of the trellis based view synthesis process.

In this embodiment of the invention, a method is used to enhance the quality of the dense depth image based on the dense depth image and the sparse depth features. In this context, enhancement refers to the correction of errors or suppression of noise due to the estimation or acquisition of the dense depth image. The enhanced depth image is used in the subsequent view synthesis.

As shown in FIG. 12, the depth enhancement 1201 can be applied to dense depth images 1011 and sparse depth features 1021 corresponding to the acquired left and right views. A second depth enhancement 1203 corresponds to the virtual view during view synthesis 1230. The first depth enhancement is applied for the left view to produce a first enhanced dense depth image 1202. The first depth enhancement can also be applied independently for the right view.

In this embodiment, the set of depth candidates 202 is selected from the first enhanced depth image. The cost of each depth candidate is determined before a path through the trellis with the minimum cost is selected.

Depth enhancement is followed by occlusion handling 130, i.e., hole filling, and warping 110, or extrapolation if a single view is used, which is only applied to the first enhanced depth images(s). The texture images are not used at this time.

During view synthesis 1230, the second depth enhancement 1203 is applied to first enhanced depth image, after the occlusion handling-warping-extrapolating for the virtual view to produce a second enhanced depth image at the virtual view position. The second enhanced depth image is then used during second warping-extrapolating with the texture image (s).

During both the first and second depth enhancement, the input depth specified in the dense depth image is always selected as the first candidate. This depth can be incorrect, and thus, lead to artifacts or inconsistencies with respect to the input images. Therefore, additional candidates are considered.

During the first depth enhancement, the alternative depth candidates are selected based on a minimal collocated (color) intensity difference of the preceding pixels of a same row in the texture image. Also, the depth of the nearest sparse depth feature is also selected as an alternative candidate.

During the second depth enhancement, the median depth from preceding five depths of the same row and the same column are selected as alternative candidates.

Following the second depth enhancement, the texture images 1221-1222, can be warped 1240, and blended-extrapolated 1250 to produce the virtual image 1002.

During the first depth enhancement, three measures are considered for the cost function of the depth candidates: stereo cost, i.e., the color intensity consistency between two views; the color difference cost, i.e. the color intensity difference between the current location and the candidate pixel location; and the depth difference cost, i.e., the depth difference between the current pixel and the alternative candidates.

Figure 13:
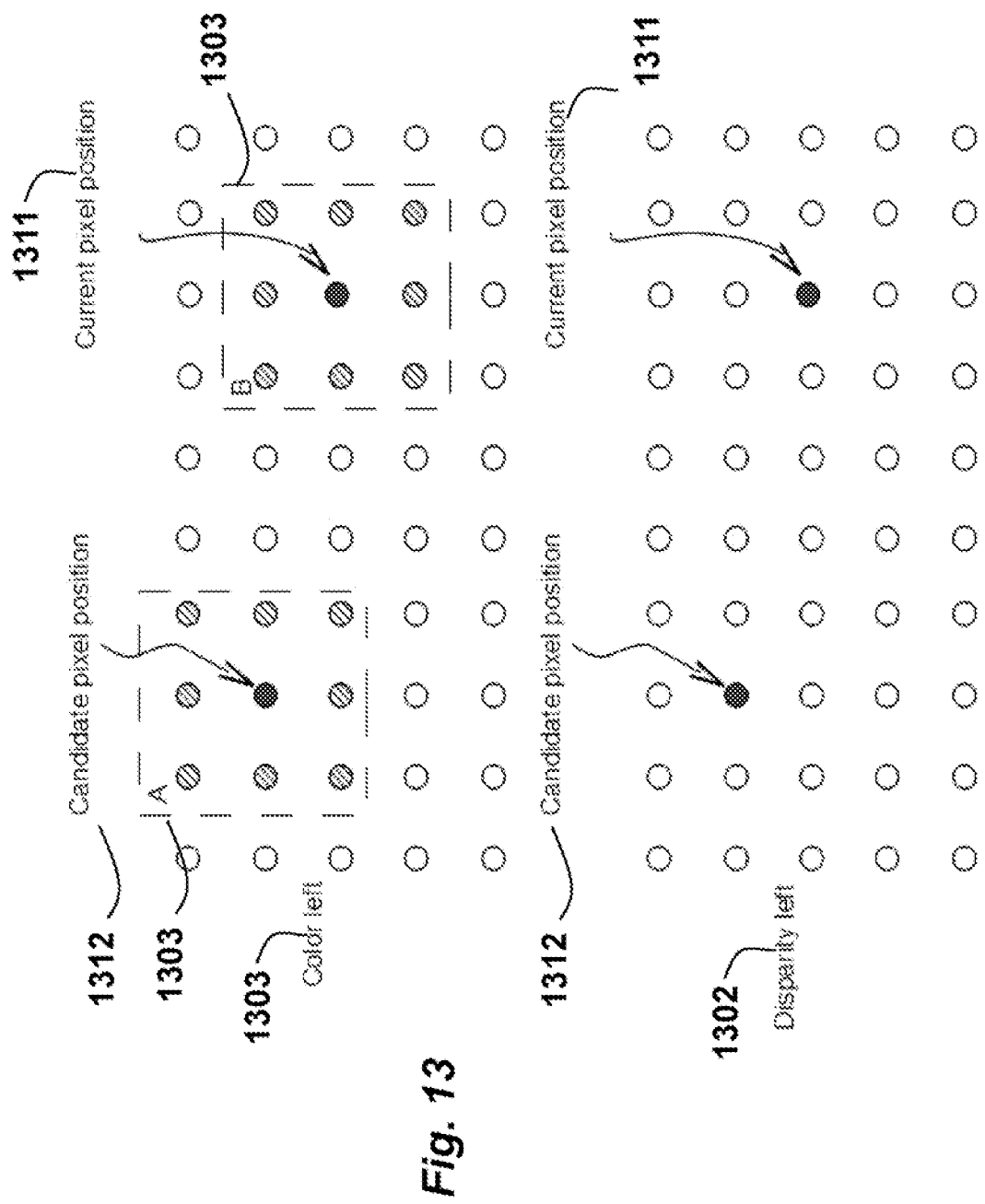
FIG. 13 is an illustration of pixels that are used for a color difference cost calculation.

As shown in FIG. 13, stereo cost is defined by the mean-removed mean absolute difference (mrMAD) between two windows (A, B) in the left and right color (texture) images whose locations are dependent on the currently pixel location and the depth.

FIG. 13 shows an example of the color difference costs. The left color image 1301 is shown on the top, and the depth (disparity) image is shown on the bottom. The color difference cost is defined as the MAD of the two surrounding windows 1303 of the current 1311, and the candidate 1312 pixel positions. The right images are processed similarly.

In Depth Enhancement B, only the stereo cost and the depth difference cost are considered. To determine the stereo cost, the locations of the two windows in the reference views are determined. This determination depends on the current pixel location, candidate depth, and the virtual view position relative to the reference views.

After the cost of the candidate disparity is determined, it is compared to the cost of the current disparity. If the cost of the candidate disparity is less then the cost of the current disparity, the current disparity is updated to the candidate disparity. After all the pixels are processed, the enhanced depth map is outputted in the subsequent steps.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating a virtual image for a virtual view of a 3D scene based on a texture image and a depth image, wherein the depth image includes an associated dense depth image and associated sparse dense features, comprising steps of:
    applying a first depth enhancement to the dense depth image and the sparse depth features to obtain a first enhanced depth image;
    determining a plurality of candidate depths for each pixel of the first enhanced depth image;
    determining; for each candidate depth, a cost that estimates a synthesis quality of the virtual image;
    selecting a candidate depth with a least cost to produce an enhanced depth for the pixel in the first enhanced depth image; and
    applying view synthesis to the first depth images and the corresponding texture image to generate the virtual image, wherein the least cost is based on stereo cost, a color intensity consistency between two views, and a color difference cost wherein the steps are performed in a processor.

2. The method of claim 1, further comprising:
    applying, for the virtual view, a second depth enhancement to the first enhanced depth image to obtain a second enhanced depth image to be used during the view synthesis.

3. The method of claim 1, wherein the steps are similarly performed for left and right views of the 3D scene.

4. The method of claim 1, wherein the first and second depth enhancements correct errors and suppress noise due to an estimation or an acquisition of the dense depth images and sparse depth features.

5. The method of claim 1, wherein the first depth enhancement is followed by occlusion handling on the first enhanced depth image.

6. The method of claim 1, wherein the least cost is determined before a path through a trellis with a minimum cost is selected.

7. The method of claim 6, wherein the candidate depths are based on a minimal collocated intensity difference of preceding pixels of a same row of the texture image.

8. The method of claim 1, wherein the candidate depth includes a nearest sparse depth feature.

9. The method of claim 1, wherein the least cost is based on stereo cost, a color intensity consistency between two views, and a color difference cost.

10. The method of claim 1, wherein the stereo cost is defined by a mean-removed mean absolute difference between two windows in left and right texture images.

11. The method of claim 1, further comprising:
    determining a cost of a disparity of the candidate depths.

12. A method for generating a virtual image for a virtual view of a 3D scene based on a texture image and a depth image, wherein the depth image includes an associated dense depth image and associated sparse dense features, comprising the steps of:
    applying a first depth enhancement to the dense depth image and the sparse depth features to obtain a first enhanced depths image;
    determining a plurality of candidate depths for each pixel of the first enhances depth image;
    determining, for each candidate depth, a cost that estimates a synthesis quality of the virtual image;
    selecting a candidate depth with a least cost to produce an enhanced depth for the pixel in the first enhanced depth image; and
    applying view synthesis to the first depth images and the corresponding texture image to generate the virtual image, a color intensity consistency between two views, and a color difference cost, wherein the least cost is determined before a path through a trellis with a minimal collocated is selected, wherein the candidate depths are based on a minimal collocated intensity difference of preceding pixels of a same row of the texture image, and wherein the steps are performed in a processor.

* * * * *